United States Patent
Chan

(10) Patent No.: US 7,868,863 B2
(45) Date of Patent: Jan. 11, 2011

(54) LIQUID CRYSTAL DISPLAY HAVING IMAGE EDGE ENHANCEMENT CIRCUIT AND IMAGE EDGE ENHANCEMENT METHOD FOR SAME

(75) Inventor: Kai-Chieh Chan, Miao-Li (TW)

(73) Assignee: Chimel Innolux Corporation, Miao-Li County (TW)

( * ) Notice: Subject to any disclaimer, the term of this patent is extended or adjusted under 35 U.S.C. 154(b) by 904 days.

(21) Appl. No.: 11/788,967

(22) Filed: Apr. 23, 2007

(65) Prior Publication Data

US 2007/0247405 A1 Oct. 25, 2007

(30) Foreign Application Priority Data

Apr. 21, 2006 (TW) .............................. 95114357 A

(51) Int. Cl.
*G09G 3/36* (2006.01)
(52) U.S. Cl. .......................... 345/88; 345/204; 345/690; 348/252
(58) Field of Classification Search ........... 345/87–103, 345/690, 589, 204; 348/252
See application file for complete search history.

(56) References Cited

U.S. PATENT DOCUMENTS

| | | | |
|---|---|---|---|
| 5,748,167 A | 5/1998 | Watanabe et al. | |
| 6,747,661 B1 | 6/2004 | Peterson | |
| 6,774,943 B1 * | 8/2004 | Kao et al. | 348/252 |
| 6,937,224 B1 | 8/2005 | Miyachi | |
| 7,050,065 B1 * | 5/2006 | Young | 345/604 |
| 7,139,022 B1 * | 11/2006 | Raffy | 348/273 |
| 7,173,663 B2 * | 2/2007 | Skow et al. | 348/364 |
| 7,453,475 B2 * | 11/2008 | Nitta et al. | 345/690 |
| 7,489,349 B2 * | 2/2009 | Kohashi et al. | 348/234 |
| 7,636,472 B2 | 12/2009 | Maruoka | |
| 7,649,557 B2 * | 1/2010 | Song et al. | 348/252 |
| 2004/0012551 A1 * | 1/2004 | Ishii | 345/87 |
| 2005/0238225 A1 * | 10/2005 | Jo et al. | 382/162 |
| 2006/0132509 A1 * | 6/2006 | Choe et al. | 345/690 |
| 2008/0056604 A1 * | 3/2008 | Choe et al. | 382/269 |

FOREIGN PATENT DOCUMENTS

TW I245557 B 12/2005

* cited by examiner

*Primary Examiner*—Lun-Yi Lao
(74) *Attorney, Agent, or Firm*—Wei Te Chung

(57) ABSTRACT

An exemplary liquid crystal display (200) includes a data circuit (230), a timing control and video output unit (210). The timing control and video output unit includes an image edge enhancement circuit (211) configured for sharpening at least one edge of an image shown by the liquid crystal display, and a converter (212). The image edge enhancement circuit includes a color adjusting unit (214) and a brightness comparison unit (213). The color adjusting unit configured for receiving and adjusting Cb, Cr color factors of the YCbCr image signals according to a result of comparison of brightness factors Y of the YCbCr image signals received from the brightness comparison unit. The adjusted YCbCr image signal is converted to a corresponding RGB signals by the converter circuit and the RGB signals are sent to the data driving circuit.

8 Claims, 5 Drawing Sheets

| Y1,1 | Y1,2 | Y1,3 | Y1,4 | Y1,5 | Y1,6 | Y1,7 | Y1,8 | Y1,9 |
| Cb1,1 | Cb1,1 | Cb1,1 | Cb1,1 | Cb1,5 | Cb1,5 | Cb1,5 | Cb1,5 | Cb1,9 |
| Cr1,1 | Cr1,1 | Cr1,1 | Cr1,1 | Cr1,5 | Cr1,5 | Cr1,5 | Cr1,5 | Cr1,9 |
| Y2,1 | Y2,2 | Y2,3 | Y2,4 | Y2,5 | Y2,6 | Y2,7 | Y2,8 | Y2,9 |
| Cb2,1 | Cb2,1 | Cb2,1 | Cb2,1 | Cb2,5 | Cb2,5 | Cb2,5 | Cb2,5 | Cb2,9 |
| Cr2,1 | Cr2,1 | Cr2,1 | Cr2,1 | Cr2,5 | Cr2,5 | Cr2,5 | Cr2,5 | Cr2,9 |
| Y3,1 | Y3,2 | Y3,3 | Y3,4 | Y3,5 | Y3,6 | Y3,7 | Y3,8 | Y3,9 |
| Cb3,1 | Cb3,1 | Cb3,1 | Cb3,1 | Cb3,5 | Cb3,5 | Cb3,5 | Cb3,5 | Cb3,9 |
| Cr3,1 | Cr3,1 | Cr3,1 | Cr3,1 | Cr3,5 | Cr3,5 | Cr3,5 | Cr3,5 | Cr3,9 |
| Y4,1 | Y4,2 | Y4,3 | Y4,4 | Y4,5 | Y4,6 | Y4,7 | Y4,8 | Y4,9 |
| Cb4,1 | Cb4,1 | Cb4,1 | Cb4,1 | Cb4,5 | Cb4,5 | Cb4,5 | Cb4,5 | Cb4,9 |
| Cr4,1 | Cr4,1 | Cr4,1 | Cr4,1 | Cr4,5 | Cr4,5 | Cr4,5 | Cr4,5 | Cr4,9 |
| Y5,1 | Y5,2 | Y5,3 | Y5,4 | Y5,5 | Y5,6 | Y5,7 | Y5,8 | Y5,9 |
| Cb5,1 | Cb5,1 | Cb5,1 | Cb5,1 | Cb5,5 | Cb5,5 | Cb5,5 | Cb5,5 | Cb5,9 |
| Cr5,1 | Cr5,1 | Cr5,1 | Cr5,1 | Cr5,5 | Cr5,5 | Cr5,5 | Cr5,5 | Cr5,9 |

FIG. 6
(RELATED ART)

| Y1,1 Cb1,1 Cr1,1 | Y1,2 Cb1,1 Cr1,1 | Y1,3 Cb1,3 Cr1,3 | Y1,4 Cb1,3 Cr1,3 | Y1,5 Cb1,5 Cr1,5 | ---- |
| Y2,1 Cb2,1 Cr2,1 | Y2,2 Cb2,1 Cr2,1 | Y2,3 Cb2,3 Cr2,3 | Y2,4 Cb2,3 Cr2,3 | Y2,5 Cb2,5 Cr2,5 | ---- |
| Y3,1 Cb3,1 Cr3,1 | Y3,2 Cb3,1 Cr3,1 | Y3,3 Cb3,3 Cr3,3 | Y3,4 Cb3,3 Cr3,3 | Y3,5 Cb3,5 Cr3,5 | ---- |
| Y4,1 Cb4,1 Cr4,1 | Y4,2 Cb4,1 Cr4,1 | Y4,3 Cb4,3 Cr4,3 | Y4,4 Cb4,3 Cr4,3 | Y4,5 Cb4,5 Cr4,5 | ---- |
| Y5,1 Cb5,1 Cr5,1 | Y5,2 Cb5,1 Cr5,1 | Y5,3 Cb5,3 Cr5,3 | Y5,4 Cb5,3 Cr5,3 | Y5,5 Cb5,5 Cr5,5 | ---- |

FIG. 7
(RELATED ART)

LIQUID CRYSTAL DISPLAY HAVING IMAGE EDGE ENHANCEMENT CIRCUIT AND IMAGE EDGE ENHANCEMENT METHOD FOR SAME

FIELD OF THE INVENTION

The present invention relates to a liquid crystal display having an image edge enhancement circuit, which is configured to sharpen images shown by the liquid crystal display.

GENERAL BACKGROUND

A typical liquid crystal display generally includes a display panel and a backlight module for illuminating the display panel. The display panel includes two glass substrates, and a liquid crystal layer is sealed between the substrates. The display panel receives image signals from a data circuit, and displays desired images according to the image signals.

Referring to FIG. 5, this is a block diagram of a conventional liquid crystal display 100, showing an image displaying process thereof. The liquid crystal display 100 includes a timing control and video output unit 110, a scanning circuit 120, a data circuit 130, and a liquid crystal panel 140 having a plurality of pixels (not shown) defined thereon. The timing control and video output unit 110 includes a converter circuit 111.

Image signals YCbCr are used in the liquid crystal display 100. In general, the image signals YCbCr are compressed, in order to reduce the volume thereof during transmission. The compressed image signals YCbCr are transmitted to the timing control and video output unit 110. Each image signal YCbCr is composed of three factors, a brightness factor Y, and two color factors Cb, Cr. The image signal YCbCr is transformed into a corresponding RGB (red, green, and blue) signal by the converter circuit 111, and is then sent to the data circuit 130. The timing control and video output unit 110 also sends a control signal to the scanning circuit 120. After the RGB signal is processed by the data circuit 130 and the control signal is processed by the scanning circuit 120, the RGB and control signals are sent to the liquid crystal panel 140. An image is displayed through each pixel on the liquid crystal panel 240 according to the control signal and the RGB signal received.

The human eye is more sensitive to brightness diversity than color diversity. Accordingly, each image signal YCbCr received by the timing control and video output unit 110 already has compressed color factors Cb, Cr. Thereby, the volume of the transmitted image signal YCbCr is reduced.

Referring to FIG. 6, this is an abbreviated diagram showing image signals YCbCr divided among the pixels of the liquid crystal panel 140, the image signals YCbCr having a compression pattern of 4:1:1. Generally, while an image is displayed on the liquid crystal panel 240, a color difference occurred among adjacent pixels is slight, whereas a large color difference occurs at adjacent pixels showing an edge of the image. Therefore, a color segment having pixels with a slight or no color difference can be defined. Each image signal YCbCr within each color segment for displaying an image has the same color factors Cb, Cr but different brightness factors Y. For example, for a topmost, leftmost one of the color segments illustrated, the color segment has the same color factors $Cb_{1,1}$, $Cr_{1,1}$, but different brightness factors $Y_{1,1}$, $Y_{1,2}$, $Y_{1,3}$, $Y_{1,4}$ respectively.

During compression of the image signals YCbCr, four adjacent image signals YCbCr arranged in a line are designated to each color segment. The color factors Cb, Cr of the four image signals YCbCr and the brightness factors Y thereof are selected respectively for compression. Then the compressed images signals YCbCr are transmitted.

Referring to FIG. 7, this is an abbreviated diagram showing image signals YCbCr divided among the pixels of the liquid crystal panel 140, the image signals YCbCr having a compression pattern of 4:2:2. The image signals YCbCr within each color segment for displaying an image have the same color factors Cb, Cr but different brightness factors Y. For example, for a topmost, leftmost one of the color segments illustrated, the image signals YCbCr have the same color factors $Cb_{1,1}$, $Cr_{1,1}$, but different brightness factors $Y_{1,1}$, $Y_{1,2}$ respectively.

During compression of the image signals YCbCr, two adjacent image signals YCbCr arranged in a line are designated to each color segment. The color factors Cb, Cr of the two image signals YCbCr and the brightness factors Y thereof are selected respectively for compression. Then the compressed images signals YCbCr are transmitted.

A benefit of the above-mentioned compressing the image signal YCbCr is to reduce the image signal volume during the transmitting. However, some adjacent image signal showing an edge of an image may have a large color difference therebetween, and a distortion after the image signal YCbCr be transferred into a RGB signal, and a blur may occur in the edge of the displaying image.

Accordingly, what is needed is a liquid crystal display configured to overcome the above-described problems.

SUMMARY

An exemplary liquid crystal display includes a data circuit, a timing control and video output unit. The timing control and video output unit includes an image edge enhancement circuit configured for sharpening at least one edge of an image shown by the liquid crystal display, and a converter. The image edge enhancement circuit includes a color adjusting unit and a brightness comparison unit. The color adjusting unit configured for receiving and adjusting Cb, Cr color factors of the YCbCr image signals according to a result of comparison of brightness factors Y of the YCbCr image signals received from the brightness comparison unit. The adjusted YCbCr image signal is converted to a corresponding RGB signals by the converter circuit and the RGB signals are sent to the data driving circuit.

A detailed description of embodiments of the present invention is given below with reference to the accompanying drawings.

BRIEF DESCRIPTION OF THE DRAWINGS

In the drawings, all the views are schematic.

FIG. 6 is an abbreviated diagram showing image signals YCbCr divided among pixels of a liquid crystal panel of the liquid crystal display of FIG. 5, the image signals YCbCr having a compression pattern of 4:1:1.

FIG. 7 is an abbreviated diagram showing image signals YCbCr divided among the pixels of the liquid crystal panel of FIG. 5, the image signals YCbCr having a compression pattern of 4:2:2.

DETAILED DESCRIPTION OF PREFERRED EMBODIMENTS

Figure 1:
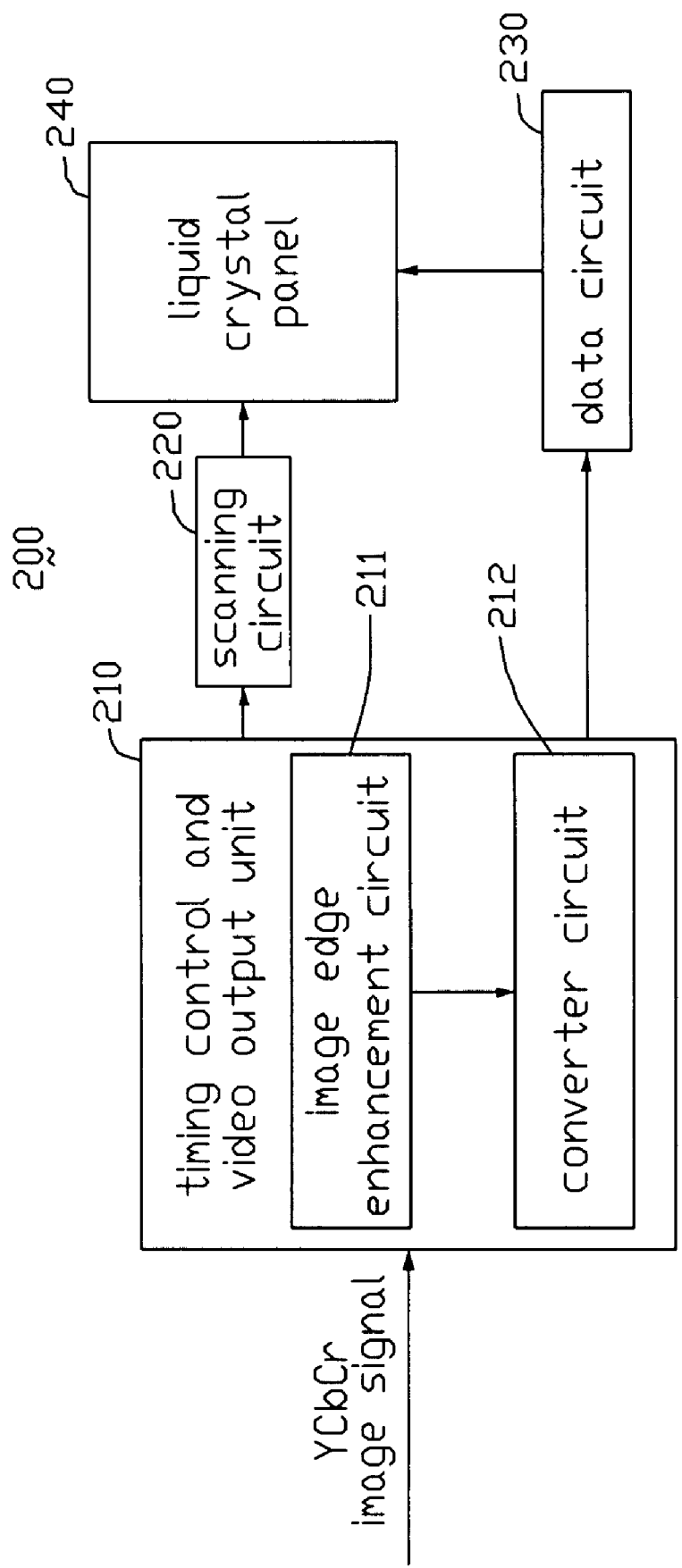
FIG. 1 is a block diagram of a liquid crystal display in accordance with the preferred embodiment of the present invention, showing an image displaying process thereof.

Referring to FIG. 1, this is a block diagram of a liquid crystal display 200 in accordance with the preferred embodiment of the present invention, showing an image displaying process thereof. The liquid crystal display 200 includes a timing control and video output unit 210, a scanning circuit 220, a data circuit 230, and a liquid crystal panel 240 having a plurality of pixels (not shown) defined thereon. The timing control and video output unit 110 includes an image edge enhancement circuit 211 and a converter circuit 212.

Image signals YCbCr are used in the liquid crystal display 200. In general, the image signals YCbCr are compressed, in order to reduce the volume thereof during transmission. The compressed image signals YCbCr are transmitted to the timing control and video output unit 210. Each image signal YCbCr is composed of three factors, a brightness factor Y, and two color factors Cb, Cr. The image signal YCbCr is transformed into a corresponding RGB (red, green, and blue) signal by the converter circuit 212, and is then sent to the data circuit 230. The timing control and video output unit 210 also sends a control signal to the scanning circuit 220. After the RGB signal is processed by the data circuit 230 and the control signal is processed by the scanning circuit 220, the RGB and control signals are sent to the liquid crystal panel 240. An image is displayed through each pixel on the liquid crystal panel 240 according to the control signal and the RGB signal received.

Figure 2:
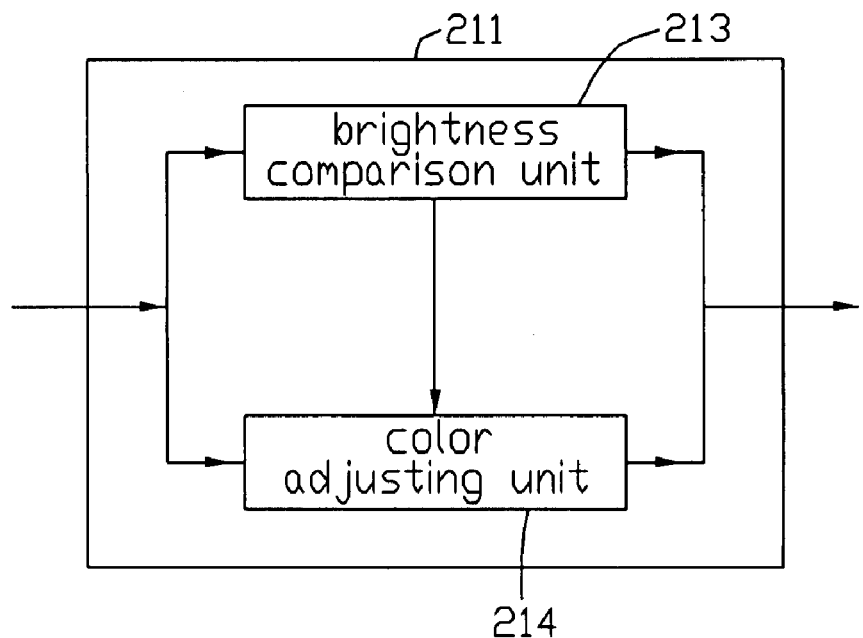
FIG. 2 is a block diagram of an image edge enhancement circuit of the liquid crystal display of FIG. 1.

Referring to FIG. 2, this shows a block diagram of the image edge enhancement circuit 211. The image edge enhancement circuit 211 includes a brightness comparison unit 213 and a color adjusting unit 214. The image edge enhancement circuit 211 enhances edges of images displayed on the liquid crystal display panel 240 according to the following method.

Figure 3:
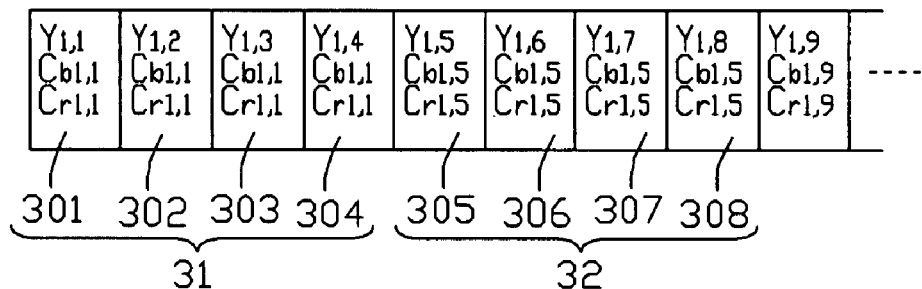
FIG. 3 is an abbreviated diagram showing image signals YCbCr divided among pixels of a liquid crystal panel of the liquid crystal display of FIG. 1, the image signals YCbCr having a compression pattern of 4:1:1.

Referring to FIG. 3, this is an abbreviated diagram showing image signals YCbCr divided among pixels of the liquid crystal panel 240, the image signals YCbCr having a compression pattern of 4:1:1. Eight image signals YCbCr divided by eight adjacent pixels arranged in a line have two sets of color factors $Cb_{1,1}$, $Cr_{1,1}$, and $Cb_{1,5}$, $Cr_{1,5}$; but have eight different brightness factors $Y_{1,1}$, $Y_{1,2}$, $Y_{1,3}$, $Y_{1,4}$, $Y_{1,5}$, $Y_{1,6}$, $Y_{1,7}$, $Y_{1,8}$ respectively. Four of the image signals YCbCr with the same color factors $Cb_{1,1}$, $Cr_{1,1}$ are defined as a first image signal segment 31, and the other four images signals YCbCr with the same color factors $Cb_{1,5}$, $Cr_{1,5}$ are defined as a second image signal segment 32. The first image signal segment 31 includes a first image signal 301, a second image signal 302, a third image signal 303, and a fourth image signal 304. The second image signal segment 32 includes a fifth image signal 305, a sixth image signal 306, a seventh image signal 307, and an eighth image signal 308.

Each of the first and second image signal segments 31, 32 includes a sampling signal, and at least one non-sampling signal. The first image signal 301 and the fifth image signal 305 are defined as a sampling signal of the first and second image signal segments 31, 32 respectively, and the other image signals 302, 303, 304, 306, 307, 308 are defined as non-sampling signals of the first and second image signal segments 31, 32 respectively.

The image edge enhancement circuit 211 enhances edges of images displaying on the liquid crystal display panel 240 according to the image signals YCbCr arranged line by line, as follows. Firstly, the brightness comparison unit 213 compares the difference between brightness factors Y of the received image signals YCbCr. Secondly, the color adjusting unit 214 receives the color factors Cb, Cr of the image signals YCbCr, and adjusts the color factors Cb, Cr according to a result of comparison of the brightness factors Y sent from the brightness comparison unit 213.

The first, second, third, and fourth image signals 301, 302, 303, 304 are each composed of a same color factor set having $Cb_{1,1}$ and $Cr_{1,1}$, but have different brightness factors $Y_{1,1}$, $Y_{1,2}$, $Y_{1,3}$, and $Y_{1,4}$ respectively. The fifth, sixth, seventh, and eighth image signals 305, 306, 307, 308 are each composed of a same color factor set having $Cb_{1,5}$ and $Cr_{1,5}$, but have different brightness factors $Y_{1,5}$, $Y_{1,6}$, $Y_{1,7}$, and $Y_{1,8}$ respectively.

The processing of the image signal segment 31 is taken herein as an example. Firstly, the difference between the brightness factors $Y_{1,2}$ and $Y_{1,1}$ is compared with the difference between the brightness factors $Y_{1,2}$ and $Y_{1,5}$. The result of the comparison is sent to the color adjusting unit 214 for adjusting the color factors $Cb_{1,1}$, $Cr_{1,1}$ of the second image signal 302. If the difference between the brightness factors $Y_{1,2}$ and $Y_{1,1}$ is less than the difference between the brightness factors $Y_{1,2}$ and $Y_{1,5}$, then the second image signal 302 is in the same color segment as the first image signal 301, and the color factors $Cb_{1,1}$, $Cr_{1,1}$ of the second image signal 302 are kept unchanged. Oppositely, if the difference between the brightness factors $Y_{1,2}$ and $Y_{1,1}$ is greater than the difference between the brightness factors $Y_{1,2}$ and $Y_{1,5}$, then the second image signal 302 is in the same color segment as the fifth image signal 305. In such case, the color factors $Cb_{1,1}$, $Cr_{1,1}$ of the second image signal 302 are changed to the color factors $Cb_{1,5}$, $Cr_{1,5}$, which are the color factors of the fifth image signal 305. If the difference between the brightness factors $Y_{1,2}$ and $Y_{1,1}$ is equal to the difference between the brightness factors $Y_{1,2}$ and $Y_{1,5}$, the color factors $Cb_{1,1}$, $Cr_{1,1}$ of the second image signal 302 are kept unchanged.

The third and fourth image signals 303, 304 are processed according to the same method as that described above in relation to the second image signal 302. After the third and fourth image signals 303, 304 in the first image signal segment 31 are processed, the sixth, seventh and eighth image signals 306, 307, and 308 of the second image signal segment 32 are processed according to the same method as that described above in relation to the second, third and fourth image signals 302, 303, 304.

Figure 4:
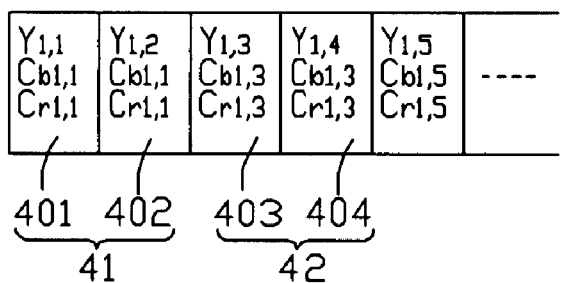
FIG. 4 is an abbreviated diagram showing image signals YCbCr divided among the pixels of the liquid crystal panel of FIG. 1, the image signals YCbCr having a compressing pattern of 4:2:2.
Figure 5:
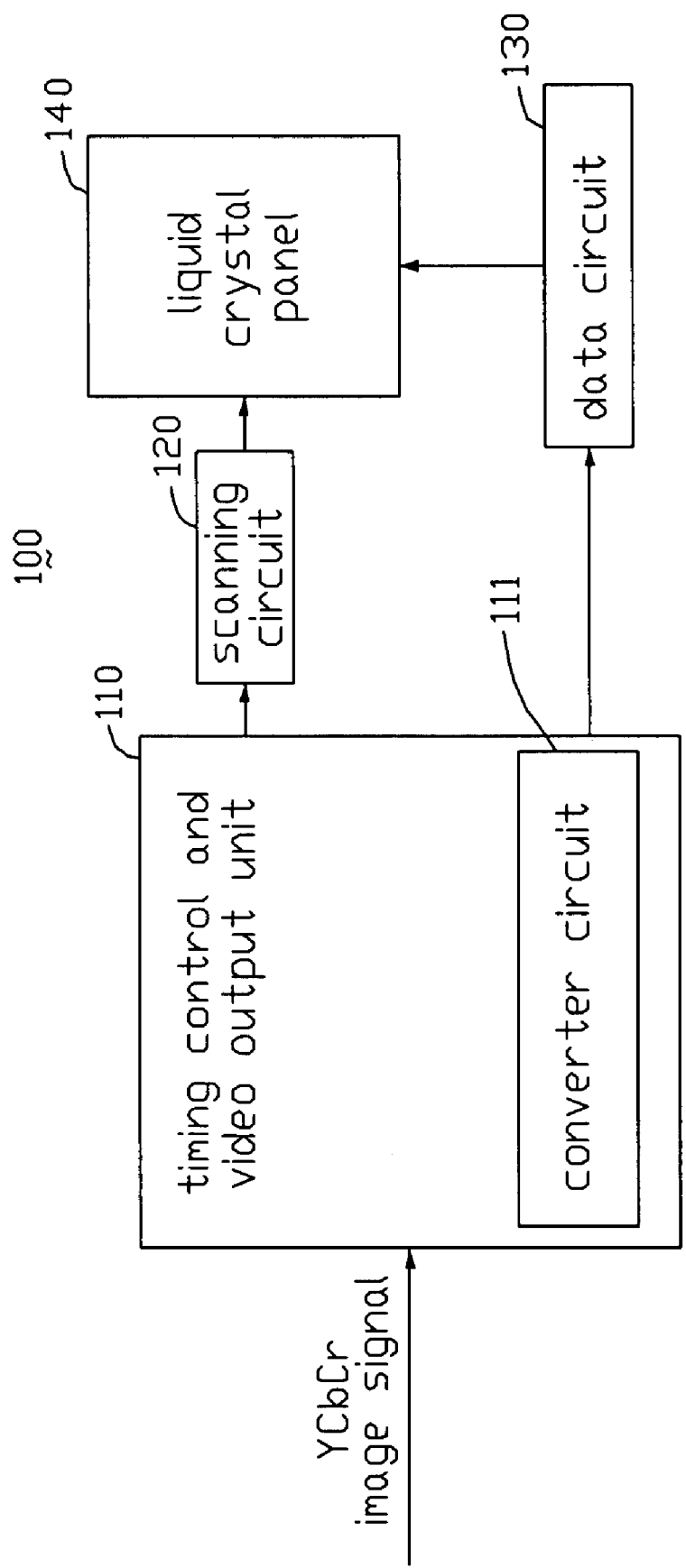
FIG. 5 is a block diagram of a conventional liquid crystal display, showing an image displaying process thereof.

Referring to FIG. 4, this is an abbreviated diagram showing image signals YCbCr divided among the pixels of the liquid crystal panel 240, the image signals YCbCr having a compression pattern of 4:2:2. Four image signals YCbCr divided by four adjacent pixels arranged in a line have two sets of color factors $Cb_{1,1}$, $Cr_{1,1}$, and $Cb_{1,3}$, $Cr_{1,3}$; but have four different brightness factors $Y_{1,1}$, $Y_{1,2}$, $Y_{1,3}$, $Y_{1,4}$ respectively. Two of the image signals YCbCr with the same color factors $Cb_{1,1}$, $Cr_{1,1}$ are defined as a first image signal segment 41, and the other two images signals YCbCr with the same color factors $Cb_{1,3}$, $Cr_{1,3}$ are defined as a second image signal segment 42. The first image signal segment 41 includes a first image signal 401 and a second image signal 402. The second image signal segment 42 includes a third image signal 403 and a fourth image signal 404.

Each of the first and second image signal segments 41, 42 includes a sampling signal and a non-sampling signal. The first image signal 401 and the third image signal 403 are defined as a sampling signal of the first and second image signal segments 41, 42 respectively, and the other image signals 402 and 404 are defined as a non-sampling signal of the first and second image signal segments 41, 42 respectively.

The image edge enhancement circuit 211 enhances edges of images displaying on the liquid crystal display panel 240 according to the image signals YCbCr arranged line by line, as follows. Firstly, the brightness comparison unit 213 compares the difference between brightness factors Y of the received image signals YCbCr. Secondly, the color adjusting unit 214 receives the color factors Cb, Cr of the image signals YCbCr, and adjusts the color factors Cb, Cr according to a result of comparison of the brightness factors Y sent from the brightness comparison unit 213.

The first and second signals 401, 402 are each composed of a same color factor set having $Cb_{1,1}$, $Cr_{1,1}$, but have different brightness factors $Y_{1,1}$, $Y_{1,2}$ respectively. The third and fourth image signals 403, 404 are each composed of a same color factor set having $Cb_{1,3}$ and $Cr_{1,3}$, but have different brightness factors $Y_{1,3}$, $Y_{1,4}$ respectively.

The processing of the image signal segment 41 is taken herein as an example. Firstly, the difference between the brightness factors $Y_{1,2}$ and $Y_{1,1}$ is compared with the difference between the brightness factors $Y_{1,2}$ and $Y_{1,3}$. The result of the comparison is sent to the color adjusting unit 214 for adjusting the color factors $Cb_{1,1}$, $Cr_{1,1}$ of the second image signal 402. If the difference between the brightness factors $Y_{1,2}$ and $Y_{1,1}$ is less than the difference between the brightness factors $Y_{1,2}$ and $Y_{1,3}$, then the second image signal 402 is in the same color segment as the first image signal 401, and the color factors $Cb_{1,1}$ and $Cr_{1,1}$ of the second image signal 402 are kept unchanged. Oppositely, if the difference between the brightness factors $Y_{1,2}$ and $Y_{1,1}$ is greater than the difference between the brightness factors $Y_{1,2}$ and $Y_{1,3}$, then the second image signal 402 is in the same color segment as the third image signal 403. In such case, the color factors $Cb_{1,1}$, $Cr_{1,1}$ of the second image signal 402 are changed to the color factors $Cb_{1,3}$, $Cr_{1,3}$, which are the color factors of the third image signal 403. If the difference between the brightness factors $Y_{1,2}$ and $Y_{1,1}$ is equal to the difference between the brightness factors $Y_{1,2}$ and $Y_{1,3}$, the color factors $Cb_{1,1}$, $Cr_{1,1}$ of the second image signal 402 are kept unchanged.

After the second image signal 402 in the first image signal segment 41 is processed, the fourth image signal 404 of the second image signal segment 42 is processed according to the same method as that described above in relation to the second image signal 402.

In summary, taking the compression pattern of 4:1:1 as an example, the non-sampling signals of the image signals YCbCr can be converted to a similar color compared with their respective colors as they existed before the image signals YCbCr were compressed. Therefore, the edges of the images displaying on the liquid crystal panel 240 are sharper comparing to the corresponding edges of the images that would be displayed on a liquid crystal panel of a conventional liquid crystal display.

While preferred and exemplary embodiments have been described above, it is to be understood that the invention is not limited thereto. To the contrary, the above description is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A liquid crystal display, comprising:
   a data circuit; and
   a timing control and video output unit configured for receiving YCbCr image signals, and connected to the data circuit, the timing control and video output unit comprising a converter circuit and an image edge enhancement circuit configured for sharpening at least one edge of an image shown by the liquid crystal display, the image edge enhancement circuit comprising a color adjusting unit and a brightness comparison unit, the YCbCr image signals comprising a plurality of signal sets, each signal set including a sampling signal and at least one non-sampling signal; the brightness comparison unit configured for comparing the difference between brightness factors Y of each non-sampling signal of a previous signal set and the sampling signal of the previous signal set with the difference between brightness factors Y of each non-sampling signal of the previous signal set and the sampling signal of a next signal set, the color adjusting unit configured for receiving color factors Cb, Cr of the YCbCr image signals and adjusting the color factors Cb, Cr of the non-sampling signals of the YCbCr image signals according to a result of the comparison received from the brightness comparison unit, and the converter circuit configured for converting the adjusted YCbCr image signals to corresponding RGB signals and sending the RGB signals to the data circuit;
   wherein when the difference between the brightness factors Y of the non-sampling signal of the previous signal set and the sampling signal of the previous signal set is less than or equals the difference between the brightness factors Y of the non-sampling signal of the previous signal set and the sampling signal of the next signal set, the color adjusting unit keeps the color factors Cb, Cr of the non-sampling signal of the previous signal set equaling the color factors Cb, Cr of the sampling signal of the previous signal set; and when the difference between the brightness factors Y of the non-sampling signal of the previous signal set and the sampling signal of the previous signal set is greater than the difference between the brightness factors Y of the non-sampling signal of the previous signal set and the sampling signal of the next signal set, the color adjusting unit changes the color factors Cb, Cr of the non-sampling signal of the previous signal set to the color factors Cb, Cr of the sampling signal of the next signal set.

2. The liquid crystal display as claimed in claim 1, wherein the YCbCr image signal is compressed by a pattern of 4:1:1.

3. The liquid crystal display as claimed in claim 1, wherein the YCbCr image signal is compressed by a pattern of 4:2:2.

4. The liquid crystal display as claimed in claim 1, further comprising a scanning circuit and a liquid crystal panel, and the liquid crystal panel is connected to the data circuit and the scanning circuit.

5. A method for enhancing at least one image edge of an image shown by a liquid crystal display, wherein the liquid crystal display processes a plurality of YCbCr image signals, the plurality of YCbCr image signals comprising a plurality of YCbCr image signal sets, each YCbCr image signal set comprising a sampling signal and at least one non-sampling signal, the method comprising:
   providing an image edge enhancement circuit comprising a brightness comparison unit and a color adjusting unit;

comparing the difference between brightness factors Y of each non-sampling signal of a previous signal set and the sampling signal of the previous signal set with the difference between brightness factors Y of each non-sampling signal of the previous signal set and the sampling signal of a next signal set, by the brightness comparison unit;

sending a result of the comparison to the color adjusting circuit by the brightness comparison unit; and adjusting color factors Cb, Cr of the non-sampling signals according to the result of the comparison by the color adjusting unit;

keeping the color factors Cb, Cr of the non-sampling signal of the previous signal set equaling the color factors Cb, Cr of the sampling signal of the previous signal set when the difference between the brightness factors Y of the non-sampling signal of the previous signal set and the sampling signal of the previous signal set is less than or equals the difference between the brightness factors Y of the non-sampling signal of the previous signal set and the sampling signal of the next signal set;

changing the color factors Cb, Cr of the non-sampling signal of the previous signal set to the color factors Cb, Cr of the sampling signal of the next signal set when the difference between the brightness factors Y of the non-sampling signal of the previous signal set and the sampling signal of the previous signal set is greater than the difference between the brightness factors Y of the non-sampling signal of the previous signal set and the sampling signal of the next signal set.

6. The method as claimed in claim 5, wherein the YCbCr image signal is compressed by a pattern of 4:1:1.

7. The method as claimed in claim 5, wherein the YCbCr image signal is compressed by a pattern of 4:2:2.

8. The method as claimed in claim 5, wherein the liquid crystal display includes a data circuit, a scanning circuit and a liquid crystal panel, and the liquid crystal panel is connected to the data circuit and the scanning circuit.

* * * * *

UNITED STATES PATENT AND TRADEMARK OFFICE
CERTIFICATE OF CORRECTION

| | | |
|---|---|---|
| PATENT NO. | : 7,868,863 B2 | |
| APPLICATION NO. | : 11/788967 | |
| DATED | : January 11, 2011 | |
| INVENTOR(S) | : Kai-Chieh Chan | |

It is certified that error appears in the above-identified patent and that said Letters Patent is hereby corrected as shown below:

Title page item (73) "Assignees" should read as follows:

Chimei Innolux Corporation, Miao-Li County (TW).

Signed and Sealed this
Seventh Day of June, 2011

David J. Kappos
*Director of the United States Patent and Trademark Office*